Feb. 25, 1958  B. H. BROWALL  2,824,628
AUTOMATIC SLACK ADJUSTER FOR BRAKES
Filed Jan. 5, 1953
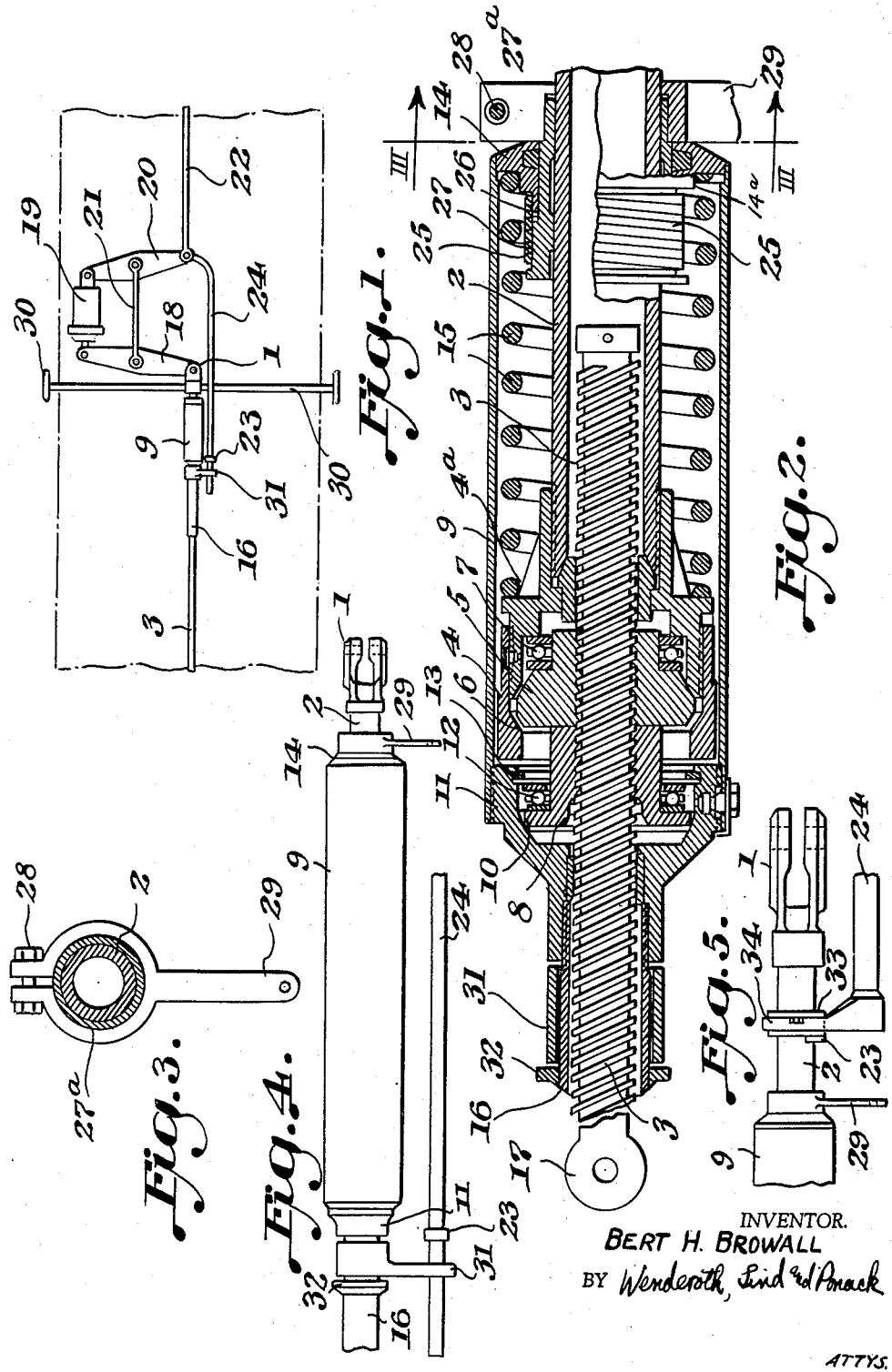
INVENTOR.
BERT H. BROWALL
BY Wenderoth, Lind and Ponack
ATTYS.

United States Patent Office 2,824,628
Patented Feb. 25, 1958

2,824,628

AUTOMATIC SLACK ADJUSTER FOR BRAKES

Bert Henry Browall, Malmo, Sweden, assignor to Svenska Aktiebolaget Bromsregulator, Malmo, Sweden, a corporation of Sweden Application January 5, 1953, Serial No. 329,552

Claims priority, application Sweden October 22, 1951

3 Claims. (Cl. 188—196)

My present invention relates to automatic slack adjusters for the brake rigging of railway cars and like vehicles. More particularly the invention relates to automatic slack adjusters of the kind comprising a brake rod forming part of the brake rigging and divided into two parts non-rotatable and axially displaceable in relation to each other and comprising a tubular rod and a screw threaded spindle inserted in said tubular rod, respectively, two locking nuts on said spindle, a housing forming part of said tubular rod, which houses one of said locking nuts, called the coupling nut, and provides a seat with which said coupling nut coacts for transmitting the brake power between said tubular rod and said spindle on braking, a tubular operating member axially displaceable on said tubular rod and axially biased in relation thereto in one direction into a normal position prevailing at released brake, a housing forming part of said operating member, which houses the other of said locking nuts, called the feed nut, and provides a seat with which said feed nut coacts for locking said spindle to said operating member on axial displacement thereof on said tubular rod in said one direction to produce a slack reducing displacement of said spindle in relation to said tubular rod, and control means operating automatically in dependence on the stroke of the brake on braking for axially displacing said operating member on said tubular rod in the opposite direction.

This application is a continuation-in-part of my U. S. application Ser. No. 286,113, filed May 5, 1952, now abandoned.

The object of the invention is to provide automatic slack adjusters of the aforesaid kind with certain improvements whereby manual adjustment of said spindle and said tubular rod axially in relation to each other at least in the slack increasing direction may be effected simply by rotating said operating member, when in said normal position prevailing at a released brake, intentionally by hand on said tubular rod, or preferably by means of a ratchet mechanism operable by means of handle bars extending to the sides of the car, whereby it will be unnecessary to go under the car for performing such manual adjustment of the automatic slack adjuster. Manual adjustment of the automatic slack adjuster to increase the slack is often necessary in connection with the substitution of new brake shoes for worn ones. With the present invention, such manual adjustment may be effected without it being necessary to perform any dismantling and re-assembling operations, such as removal and mounting of bolts in the brake rigging, operations which can be rather difficult especially where the underframe of the vehicle has little working room, such as in street cars, because it is encumbered with motors and other space-consuming equipment. And even if there is room for performing such operations, the fact always remains that going under a railway car involves a certain amount of danger.

Both single-acting and double-acting types of automatic slack adjusters of the aforesaid kind are known. The single-acting types automatically reduce the slack (composed essentially of the brake shoe clearances at released brake) when it has become too large due, for instance, to wear of the brake shoes, but lack the ability, which characterizes the double-acting types, of also automatically increasing the slack when it has become too small due, for instance, to new brake shoes having been substituted for worn ones.

The invention is applicable to the double-acting types as well as to the single-acting types, though the invention is most valuable in the single-acting types with which, due to their lack of automatically operating means for increasing the slack, an increase of the slack, when reqiured, necessarily has to be effected manually. Also with double-acting types it may, however, be desirable, for instance, to facilitate the removal of worn-out brake shoes and the mounting of new ones, that an increase of the slack can be effected manually in the released position of the brake.

As is well known, in slack adjusters of the aforesaid kind said screw threaded spindle must be axially displaceable in one direction in relation to each of two locking nuts thereon, namely in the direction in which said spindle has to be axially displaced in relation to said tubular rod to reduce the slack. Different modes of allowing for such axial displacement of said screw threaded spindle in relation to each of said locking nuts thereon are well known in the art. One such mode which is preferred consists in the screw threaded spindle and the locking nuts thereon having a high lead so as to be non-selflocking, and in each of the locking nuts being permitted to rotate on the screw spindle under the action of the pressure exerted on the threads of the locking nuts by the threads of the spindle on the axial displacement thereof in relation to the locking nut. According to another mode each of the locking nuts is divided into sectors resiliently held together around the screw threaded spindle and adapted to be moved radially out of engagement of the threads of the spindle by the pressure exerted on the threads of the locking nut by the threads of the spindle on the axial displacement thereof in relation to the locking nut. In the latter case the lead of the threads of the spindle and the locking nuts may be chosen at will. The invention is applicable both in the case in which the threads of the spindle and the locking nuts thereon have a high lead so as to be non-selflocking and in the case in which the lead of the threads of the spindle and the locking nuts thereon may be chosen at will.

The invention is characterized principally by the provision, in an automatic slack adjuster of the aforesaid kind, of means active in said normal position of said operating member for holding said coupling nut and said feed nut clutched to said operating member and for holding said coupling nut out of engagement with said seat therefor in said housing on said tubular rod, and by said operating member, when in said normal position, being free to be rotated intentionally by hand on said tubular rod for screwing said feed nut and said coupling nut on said spindle at least in the direction to produce a slack increasing displacement of said spindle and said tubular rod in relation to each other.

These and further characteristic features of the invention and the advantages obtained thereby will be apparent to those skilled in the art from the following description of a preferred form of the invention, which is illustrated on the accompanying drawings, in which:

Fig. 1 is a diagrammatic fragmental plan view of a conventional brake rigging including an automatic slack adjuster and mounted beneath the underframe of a vehicle indicated by dash and dot lines.

Fig. 2 is a fragmental longitudinal section of a single-acting slack adjuster according to the present invention included in the brake rigging.

Fig. 3 is a cross sectional view on line III—III in Fig. 2.

Fig. 4 is an elevation of the slack adjuster as shown in Figs. 1 to 3.

Fig. 5 is a fragmental elevation of a slightly modified form of the slack adjuster of Figs. 1 to 4.

The automatic slack adjuster, in the constructional form thereof shown on the drawing for illustrative purposes, comprises a brake rod divided into two parts of which one, having a jaw 1 at one end, comprises a tubular rod 2, whereas the other part comprises a screw threaded spindle 3 inserted in the tubular rod 2 through the end thereof remote from the jaw 1. Two locking nuts are screwed onto the screw threaded spindle 3, and the threads of the spindle and said nuts thereon are of a high lead, so as to be non-selflocking. On the tubular rod 2 is a housing 4 for one of the said locking nuts, namely the coupling nut 5, which is adapted to cooperate with a seat 6 in the housing 4 for coupling the two rod parts 2 and 3 to each other in one direction for transmitting the braking power between them on braking, and with an anti-friction bearing 7 mounted in the housing 4 for permitting the coupling nut 5 to rotate during a displacement of the brake rod parts 2 and 3 in relation to each other in the other direction. The other locking nut, feed nut 8, is operable by means of a tubular operating member 9 which is axially displaceable on the tubular rod 2 and has a seat 10 for the feed nut 8 to coact with, the operating member 9 having secured in one end thereof an end piece 11 housing the feed nut 8 and forming the seat 10 therefor. The feed nut 8 is adapted to coact in one direction with the seat 10 and in the other direction with an antifriction bearing 12 which in turn is adapted to coact with an abutment ring 13 in the end piece 10 of the tubular operating member 9. A coiled pressure spring 15 is inserted between an end piece 14 in the other end of the tubular operating member 9 and the housing 4 on the tube 2. Under the effect of this strong compressed spring 15 the operating member 9 is axially biased in one direction (towards the jaw 1) on the tubular rod 2 into a normal position prevailing at released brake. In the end piece 11 there is threaded a tube 16 surrounding the spindle 3 and serving the purpose of protecting the threads thereof from dirt. On its outer end the spindle 3 is provided with a jaw 17. The jaws 1 and 17 are for the connection of the brake rod comprising the parts 2 and 3 in the rigging of the brake. Fig. 1 shows, by way of example, the slack adjuster included in a conventional brake rigging comprising a cylinder lever 18 actuated by the push rod of a brake cylinder 19, a floating lever 20, a connecting rod 21 between these two brake levers, and brake pull rods for transmitting the brake power from the two brake levers to the usual brake equipment on the two ends of the vehicle. The slack adjuster forms one of the said two brake pull rods, the other of which is designated 22 in Fig. 1.

If the stroke of the brake on braking is too long as a result of the brake shoe clearances having become too large, the tubular operating member 9 is displaced in relation to the brake rod part 2 against the action of the spring 15 by being acted upon by control means 23 provided for this purpose. During the subsequent release of the brake the tubular operating member 9 returns to its normal position under the action of the spring 15, and during this return movement the operating member 9 displaces the spindle 3 in relation to the tubular rod 2 by means of the feed nut 8 in the direction to reduce the brake shoe clearances. In most cases the control means 23, which consists of an abutment, is mounted on a control rod 24 connected to a brake lever of the brake rigging. In the example shown in Fig. 1, in which the slack adjuster forms the part of the brake pull rod connected to the cylinder lever 18, the control rod 24 is connected to the floating lever 20. In certain cases, such as when the braking power is to be transmitted only to one vehicle end and thus the path of movement of the jaw 1 at correct brake shoe clearances is determined not only as to its length but also as to its position (the jaw 1 connected to a brake lever having a fixed fulcrum and an unchanging release position from which it is swung by a certain amount on braking), a control rod may however be completely dispensed with, since in such a case the control member 23 can be mounted as a fixed abutment.

So far as the slack adjuster has been described above, it corresponds to prior art. The invention purports to overcome the difficulties often encountered with previously known constructions of automatic slack adjusters in connection with manual adjustment of the slack adjuster for increasing the brake shoe clearances at a renewal of brake shoes or the like, which adjustment is performed (with the brake in released position) by rotating the spindle 3 relative to the nuts 5 and 8 in the slack increasing direction. In order to avoid the complication of providing between the spindle 3 and the jaw 17, or between the tubular rod part 2 and the jaw 1, a rotary connection and means for locking same between the occasions of manual adjustment of the slack adjuster, the invention provides improvements whereby the manual adjustment of the slack adjuster can be performed simply by rotating the operating member 9 without rotation of any of the brake rod parts 2 and 3. These improvements consist principally in means active in the normal position of the operating member 9 for holding the coupling nut 5 and the feed nut 8 clutched to the operating member 9 and for holding the coupling nut 5 out of engagement with the seat 6 therefor, and in the operating member 9, when in the normal position, being free to be rotated intentionally by hand on the tubular rod 2 for screwing the two nuts 5 and 8 as a unit on the spindle 3 at least in the direction to produce a slack increasing displacement of the spindle 1 in relation to the tubular rod 2. The reason why the coupling nut 5 must be held out of engagement with the seat 6 to permit the desired manual adjustment of the automatic slack adjuster is that otherwise the coupling nut 5 would engage the seat 6 and thereby oppose the desired manual adjustment.

In the automatic slack adjuster shown in Fig. 2 the two locking nuts 8 and 5 and the housing 4 are so shaped that on return of the operating member 9 into the normal position prevailing at released brake, the feed nut 8 abuts the coupling nut 5 and pushes the latter against the antifriction bearing 7, so that the force which the compressed spring 15 exerts between the housing 4 and the end piece 14 of the operating member 9, is transmitted from the latter by its end piece 11, the seat 10 therein, the feed nut 8, the coupling nut 5, and the antifriction bearing 7 back to the housing 4. The end piece 11 is spaced from housing 4 so that there is no contact between them. The compressed spring 15 thus is utilized not only for its usual purpose of biasing the operating member 9 into its normal position but also for holding the coupling nut 5 out of engagement with the seat 6, for holding the feed nut 8 clutched to the operating member 9 by friction between the feed nut 8 and the seat 10, and for holding the coupling nut 5 clutched to the feed nut 8 and through the latter to the operating member 9 by friction between the abutting surfaces of the two nuts, which frictions are sufficient to overcome the resistance of the antifriction bearing 7 against rotation of the coupling nut 5 on a rotation of the operating member 9 on the brake rod 2, 3. Thus the two locking nuts 8 and 5 will take part as a unit in rotation of the operating member 9 when this is in the normal position prevailing at released brake.

The fact that both the locking nuts 5 and 8 are free to rotate together with the rotatable operating member 9 when the brake is in the released position, makes it necessary or at least desirable to provide against unintentional rotation of the operating member 9 and thereby the nuts 8 and 5 under the action of vibrations during the travel of the vehicle. For the purpose of providing against unintentional rotation of the nuts 8 and 5 I prefer to utilize, as shown in Fig. 2 for illustrative purposes, a special invention which improves the invention of the present application when used in connection therewith but is useful also in non-automatic brake slack adjusters of any type comprising a manually adjustable screw-connection. For this reason I will fully describe and claim said special invention in a separate application to be filed as a continuation-in-part of my aforesaid U. S. application Serial No. 286,113, filed May 5, 1952, now abandoned, whereby the description of said special invention in the present application may be limited to what is necessary for a full understanding of the showing of Fig. 2, wherein the spring 15 is utilized also for the purpose of effectively providing against unintentional rotation of the operating member 9, and thereby of the two locking nuts 5 and 8, under the action of vibrations when the operating member 9 is in its normal position.

The simplest manner of providing against unintentional rotation of the operating member 9 is by means of a frictional resistance to rotation between the operating member 9 and the tubular rod 2, which resistance has to be overcome by the torque to be exerted on the operating member 9 for rotating it intentionally by hand on the non-rotatable tubular rod 2. With only such a frictional resistance to rotation between the operating member 9 and the tubular rod 2 there is the risk, however, that with time a considerable unintentional angular displacement of the operating member 9 on the non-rotatable tubular rod 2 may result from cumulation of minute (individually neglectable) angular displacements of the operating member under the action of vibrations or shocks creating in the operating member 9 sudden and transient torques as great as or greater than the torque that practically or conveniently can be required to be exerted on the operating member 9 for rotating it intentionally by hand. In the slack adjuster shown in Fig. 2 my aforesaid special invention is utilized for eliminating this risk by the combination with a frictional resistance to rotation between the operating member 9 and the non-rotatable tubular rod 2, of means yielding resiliently to the torque which arises with any angular displacement of the operating member 9 in relation to the non-rotatable tubular rod 2 due to the frictional resistance to rotation between them. In the construction illustrated in Fig. 2 the compressed coil spring 15 is utilized to produce the frictional resistance to rotation between the operating member 9 and the non-rotatable tubular rod 2, and as the means yielding resiliently to the torque which on any rotation of the operating member 9 in relation to the tubular rod 2 arises between the two due to the frictional resistance to rotation between them. To this end the compressed coiled spring 15 is arranged to act as a torque transmitting torsion spring between end supports 4a and 14a on the housing 4 of the tubular rod 2 and on the end piece 14 of the operating member 9, respectively, and at least one end of the spring 15 is frictionally engaged with its support, the other end of the spring, if not frictionally engaged with its support, being non-rotatably engaged therewith. Any desirable value of the frictional resistance to rotation between any of the ends of the spring 15 and its support can be obtained by a suitable shape, for instance conical, of the support. The frictional resistance offered by the spring 15 to rotation between the operating member 9 and the tubular rod 2 can be given a relatively low value without risk for any significant unintentional rotation of the operating member under the action of vibrations or shocks. The spring 15, acting as a torsion spring between the operating member and the tubular rod 2, will yield resiliently to such minute angular displacements of the operating member 9 as may occur momentaneously under the action of vibrations or shocks. Thus the operating member 9 after such minute angular displacements thereof will be returned to its manually adjusted position by the spring 15, whereby the risk of accumulation of such minute angular displacements into a considerable angular displacement of the operating member 9 from its manually adjusted position is eliminated.

Since the chief purpose of having the automatic slack adjuster also manually adjustable is to make possible an increase of the slack at renewals of worn brake shoes with the brake in released position, it may be sufficient to have the operating member 9 rotatable on the tubular rod 2 in one direction only, namely in the direction in which the operating member 9 is to be rotated by hand for manual adjustment of the slack adjuster in the slack increasing direction. For rotating the operating member 9 by hand in one direction only a simple form of ratchet mechanism can be used, which is easy to operate from the sides of the car by means of handle bars. In Fig. 2 such a ratchet mechanism is shown. It comprises a one-way clutch which is housed within the operating member 9 and comprises a coiled clutch spring 25 fitting axially aligned cylindrical surfaces on a collar 26 integral with the end-piece 14, and on a sleeve 27 rotatably mounted on the tubular rod 2 and having a projecting end 27a on which there is clamped, by means of a bolt 28 (see Fig. 3), an arm 29. The operating member 9 can be rotated in the desired direction by rocking of the arm 29. Handle bars 30 (see Fig. 1) connected to the arm 29 and extending to the sides of the car, may be provided, whereby the arm 29 can be rocked to and fro through a limited angle to adjust the slack adjuster in the slack increasing direction, without requiring the workmen to go under the car.

The full benefits of the invention will be obtained only on the condition that the tubular operating member 9, when the brake is in released position, is free to be rotated intentionally by hand on the tubular rod 2 without hindrance from the control means for the operation of the tubular operating member 9 automatically in dependence on the stroke of the brake on braking, and without any more or less difficult dismantling of said control means being necessary. When said control means consists of a fixedly mounted abutment for the operation of the tubular operating member 9 said condition is fulfilled automatically, since at released brake the tubular operating member 9 does not even touch said abutment. However, as has been mentioned in the foregoing, a control rod 24 on which the abutment 23 is located is generally used. In the slack adjuster illustrated in which the operating member 9 is provided with an arm 31 for coaction with the abutment 23 and for carrying and guiding the control rod 24 which extends through a hole in the arm 31, the aforesaid condition is fulfilled by the arm 31 being freely and easily rotatable about the longitudinal axis of the slack adjuster. Preferably the arm 31 is mounted for easy rotation on the protective tube 16 between a stop ring 32 mounted thereon and the end piece 11 of the tubular operating member 9. Such a mounting of the arm 31 results in a more slender construction than that which would be obtained by mounting the arm 31 on the tubular member 9 proper. Due to the rotary mounting, the arm 31 may remain in its position in relation to the point of attachment of the control rod 24 to the brake lever 20 when the tubular member 9 is rotated. Thus the control rod 24 does not prevent rotation of the tubular member 9.

In the somewhat modified construction illustrated in Fig. 5 the abutment 23 is provided on a ring 33 sliding on the tubular brake rod part 2 between the jaw 1 and the operating member 9 with which the abutment 23 coacts, the control rod 24 being connected to said ring by means of a fork 34.

I wish it to be understood that I have herein shown and described a form of my invention only for illustrating how it preferably can be reduced to practice and not for limiting my invention or my appendant claims therefor to this constructional form. Within the principles of the invention and the scope of the broader ones of the appendant claims there is ample room for further constructional forms and modifications, and only as an example it may be mentioned that it is preferable but not necessary to use, as herein shown and described for illustrative purposes, the feed nut 8 as an abutment which by moving together with the operating member 9 on the return thereof into normal position on the release of the brake after a braking operation pushes the coupling nut 5 out of engagement with its seat 6 and clutches the coupling nut 5 to the operating member 9, since a separate abutment for this purpose may be provided on the operating member 9.

What I claim and desire to secure by Letters Patent is:

1. An automatic brake slack adjuster of the character described, comprising a two-part brake rod, the first part of said brake rod being a tubular rod part, the second part of said brake rod being a threaded spindle with one end within one end of said tubular rod part, said threaded spindle being axially displaceable in said tubular rod part, a tubular operating member axially displaceable on said tubular rod part, spring means disposed between said tubular rod part and said operating member thereon urging said operating member toward the other end of said tubular rod part into a normal axial end position in relation thereto, said operating member having a seat therein, a feed nut in said operating member and threaded on said spindle and abutted by said seat in said operating member in the normal axial end position thereof and movable on said spindle away from said tubular rod part when not abutted by said seat in said operating member on axial displacement thereof against the force of said spring means, a housing on said one end of said tubular rod part, said housing being spaced from said operating member for permitting free rotation of said operating member relative to said housing, a coupling nut in said housing and threaded on said spindle between said feed nut and said one end of said tubular rod part, said housing having a seat therein spaced from said coupling nut when there is no tension between the parts of said brake rod and abutting said coupling nut for transmitting braking stress between said tubular rod part and said spindle; an antifriction thrust bearing between said coupling nut and said housing, said feed nut and said coupling nut being frictionally coupled for rotation together by the force of said spring means on said operating member in said normal axial end position thereof for holding said coupling nut out of engagement with said seat therefor in said housing when said operating member is in the normal axial end position, whereby rotation of said operating member, when in said normal axial end position on said tubular rod part, rotates both said nuts in unison with one another on said spindle for axially adjusting said spindle and said tubular rod part in relation to one another without rotating any one of them in relation to the other.

2. An automatic brake slack adjuster as claimed in claim 1, and means operable by hand for rotating said operating member when in said normal axial end position on said tubular rod, comprising an arm rotatably mounted on said tubular rod part, a one-way clutch connecting said operating member to said arm, and handle bars connected to said arm.

3. An automatic brake slack adjuster as claimed in claim 1, and a control rod movable in relation to said brake rod longitudinally thereof for axially displacing said operating member on said tubular brake rod against the force of said spring means on application of brakes operated by said brake rod, an arm on said operating member for said control rod to coact with, and said arm forming a guiding means for said control rod and being freely rotatable on said operating member in said normal axial end position thereof on said tubular rod part for not obstructing intentional rotation of said operating member by hand.

References Cited in the file of this patent

UNITED STATES PATENTS

| | | |
|---|---|---|
| 1,166,465 | Luburg | Jan. 4, 1916 |
| 1,811,913 | Browall | June 30, 1931 |
| 2,031,704 | Gallusser | Feb. 25, 1936 |
| 2,225,001 | Browall | Dec. 17, 1940 |
| 2,246,873 | Browall | June 24, 1941 |